US012257826B2

(12) United States Patent
Inuzuka et al.

(10) Patent No.: US 12,257,826 B2
(45) Date of Patent: Mar. 25, 2025

(54) PRINTING APPARATUS

(71) Applicant: BROTHER KOGYO KABUSHIKI KAISHA, Nagoya (JP)

(72) Inventors: Kosuke Inuzuka, Nagoya (JP); Yusuke Arai, Nagoya (JP); Isao Kobayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 18/060,782

(22) Filed: Dec. 1, 2022

(65) Prior Publication Data

US 2023/0202214 A1 Jun. 29, 2023

(30) Foreign Application Priority Data

Dec. 24, 2021 (JP) ................................ 2021-211488

(51) Int. Cl.
*B41J 11/66* (2006.01)
*B41J 13/00* (2006.01)

(52) U.S. Cl.
CPC ......... *B41J 11/663* (2013.01); *B41J 13/0009* (2013.01)

(58) Field of Classification Search
CPC .. B41J 11/663; B41J 13/0009; B41J 11/0095; B41J 11/706
See application file for complete search history.

(56) References Cited

U.S. PATENT DOCUMENTS

2021/0331495 A1* 10/2021 Shimizu .................. B41J 2/175

FOREIGN PATENT DOCUMENTS

JP 2003260830 A 9/2003

* cited by examiner

*Primary Examiner* — Lisa Solomon
(74) *Attorney, Agent, or Firm* — Scully, Scott, Murphy & Presser, P.C.

(57) ABSTRACT

A printing apparatus includes a conveying unit which conveys a printing medium in a conveying direction; a printing unit which prints an image on the printing medium conveyed by the conveying unit; a processing unit which includes a processing member and which executes a processing action for processing the printing medium by moving the processing member while causing the processing member to contact the printing medium; and a controller. The controller executes a processing process for causing the processing unit to execute the processing action with respect to the printing medium by moving the processing unit from a first position to a second position in an intersecting direction; a first conveying process for causing the conveying unit to convey a processed printing medium in the conveying direction; and a first moving process for moving the processing unit from the second position to the first position after the first conveying process.

11 Claims, 9 Drawing Sheets

PRINTING APPARATUS

REFERENCE TO RELATED APPLICATIONS

This application claims priority from Japanese Patent Application No. 2021-211488 filed on Dec. 24, 2021. The entire content of the priority application is incorporated herein by reference.

BACKGROUND ART

The present disclosure relates to a printing apparatus.

Conventionally, there is known a printer provided with a cutter carriage for cutting a printing paper. The cutter carriage, which is provided for this printer, is reciprocatively movable between two positions. The cutter carriage is configured to return to a waiting position which is one position of the two positions after cutting the printing paper.

DESCRIPTION

In the above described printer, the cutter carriage returns to the waiting position after the cutter carriage cuts the printing paper which is conveyed in the conveying direction. On this account, the following problem arises. That is, the time is prolonged, which is required until a start of the conveyance of the printing paper disposed downstream in the conveying direction from the cutting position toward the downstream in the conveying direction after the cutter carriage cuts the printing paper conveyed in the conveying direction. An object of the present disclosure is to shorten the time which is required until the start of the conveyance of a printing medium disposed downstream in the conveying direction from a processing unit toward the downstream in the conveying direction after the processing unit processes the printing medium conveyed in the conveying direction.

According to an aspect of the present disclosure, there is provided a printing apparatus including:

- a conveying unit configured to convey a printing medium in a conveying direction;
- a printing unit configured to print an image on the printing medium conveyed by the conveying unit;
- a processing unit including a processing member and configured to execute a processing action for processing the printing medium, on which the image has been printed by the printing unit and which has been conveyed by the conveying unit, by moving the processing member while causing the processing member to contact the printing medium; and
- a controller configured to execute:
- a processing process for causing the processing unit to execute the processing action with respect to the printing medium by moving the processing unit from a first position to a second position along an intersecting direction intersecting with the conveying direction;
- a first conveying process for causing the conveying unit to convey a processed printing medium, for which the processing action has been executed in the processing process, in the conveying direction until an upstream end in the conveying direction of the processed printing medium moves to a position downstream in the conveying direction from the processing unit; and
- a first moving process for moving the processing unit from the second position to the first position after the first conveying process.

In the printing apparatus, the processed printing medium is conveyed, and then the processing unit is moved from the second position to the first position. Accordingly, it is possible to shorten the processing time as compared with a case in which the processing unit is moved from the second position to the first position before conveying the processed printing medium. Specifically, it is possible to shorten the time required until the start of the conveyance of the processed printing medium disposed at the downstream from the processing unit toward the downstream from the processing unit after causing the processing unit to process the printing medium, by the period of time required to move the processing unit from the second position to the first position.

In the foregoing aspect, in a case that the processing process is executed for the printing medium on which an image of printing data of a final page included in a printing job is printed by the printing unit, the controller may execute the first moving process after the first conveying process. In a case that the processing process is executed for the printing medium on which an image of printing data of any page other than the final page included in the printing job is printed by the printing unit, the controller may execute a second moving process for moving the processing unit from the second position to the first position after the processing process; and a second conveying process for causing the conveying unit to convey the processed printing medium in the conveying direction until the upstream end of the processed printing medium moves to the position downstream in the conveying direction from the processing unit and causing the conveying unit to convey a next printing medium to be conveyed continuously to the processed printing medium, after the second moving process.

If the image of the printing data of the page other than the final page is printed on the printing medium, i.e., if the printing medium to be conveyed next exists, then the controller moves the processing unit from the second position to the first position, and then the controller conveys the processed printing medium. Further, the controller conveys the next printing medium to be conveyed continuously to the processed printing medium. Accordingly, the processing unit has already returned to the first position. Therefore, it is unnecessary to move the processing unit from the second position to the first position between the processed printing medium and the next printing medium. Thus, in the conveyance performed by the conveying unit, the distance between the processed printing medium and the next printing medium can be advantageously set with respect to the conveyance time irrelevant to the movement timing of the processing unit.

In the foregoing aspect, in a case that a first predetermined condition is fulfilled, the controller may execute the first moving process after the first conveying process; and in a case that a second predetermined condition different from the first predetermined condition is fulfilled, the controller may execute a second moving process for moving the processing unit from the second position to the first position after the processing process; and a second conveying process for causing the conveying unit to convey the processed printing medium in the conveying direction until the upstream end of the processed printing medium moves to the position downstream in the conveying direction from the processing unit, after the second moving process. It is possible to switch the order of execution of the process for conveying the processed printing medium and the process for moving the processing unit depending on the condition.

In the foregoing aspect, the first predetermined condition may be a condition that a number of dots formed per unit area of a surface of the printing medium by the printing unit is not less than a predetermined number of dots; and the second predetermined condition may be a condition that the number of dots formed per unit area of the surface is less than the predetermined number of dots.

If the number of dots formed on the printing medium is large, there is such a possibility that any wrinkle appears on the processed printing medium. In this case, the controller moves the processing unit from the second position to the first position after conveying the processed printing medium. Thus, it is possible to avoid such a situation that any load is exerted on the processing unit by the wrinkle appearing on the printing medium.

In the foregoing aspect, the first predetermined condition may be a condition that an amount of ink ejected per unit area of a surface of the printing medium by the printing unit is not less than a predetermined amount of the ink; and the second predetermined condition may be a condition that the amount of the ink ejected per unit area of the surface is less than the predetermined amount of the ink.

If the amount of the ink ejected to the printing medium is large, there is such a possibility that any wrinkle appears on the processed printing medium. In this case, the controller moves the processing unit from the second position to the first position after conveying the processed printing medium. Thus, it is possible to avoid such a situation that any load is exerted on the processing unit by the wrinkle appearing on the printing medium.

In the foregoing aspect, the printing apparatus may further comprise a receiving unit which receives an operation of a user for selecting one of a first mode for executing the first moving process after the first conveying process and a second mode for executing the second conveying process after the second moving process; wherein the first predetermined condition may be a condition that the receiving unit receives an operation by the user for selecting the first mode; and the second predetermined condition may be a condition that the receiving unit receives an operation by the user for selecting the second mode. The user can easily switch the movement timing of the processing unit, while confirming the state of the processed printing medium.

In the foregoing aspect, the first predetermined condition and the second predetermined condition may be conditions for limiting an environment around the printing apparatus. It is possible to appropriately switch the movement timing of the processing unit on the basis of the surrounding environment.

In the foregoing aspect, the first predetermined condition and the second predetermined condition may be conditions for specifying a type of the printing medium. It is possible to appropriately switch the movement timing of the processing unit on the basis of the type of the printing medium.

In the foregoing aspect, the controller may execute the first moving process after executing the first conveying process and a third conveying process for causing the conveying unit to convey a next printing medium to be conveyed continuously to the processed printing medium such that a course, along which the processing unit moves, is positioned between the processed printing medium and the next printing medium.

The course, along which the processing unit moves, is positioned between the processed printing medium and the next printing medium. On this account, the processing unit can be moved from the second position to the first position such that the processing unit does not contact the printing medium.

In the foregoing aspect, in a case that a resolution of the image printed on the printing medium by the printing unit is not less than a predetermined resolution, the controller may execute the first moving process after executing the first conveying process and the third conveying process such that the course is positioned between the processed printing medium and the next printing medium.

In a case that the image is being printed on the printing medium by the printing unit, the printing medium is conveyed by the conveying unit by every predetermined conveyance amount. In a case that the resolution of the image is high, the predetermined conveyance amount becomes small as compared with a case that the resolution of the image is low. The printing medium is conveyed little by little. Therefore, it is easy to realize such configuration that the printing medium is conveyed so that the course, along which the processing unit moves, is positioned between the processed printing medium and the next printing medium.

In the foregoing aspect, the controller may execute the first conveying process and the third conveying process such that a first conveying speed of the processed printing medium is faster than a second conveying speed of the next printing medium.

The distance is increased between the processed printing medium and the next printing medium. Therefore, the controller can easily move the processing unit from the second position to the first position.

FIRST EMBODIMENT

Configuration of Printing Apparatus 1

Figure 1:
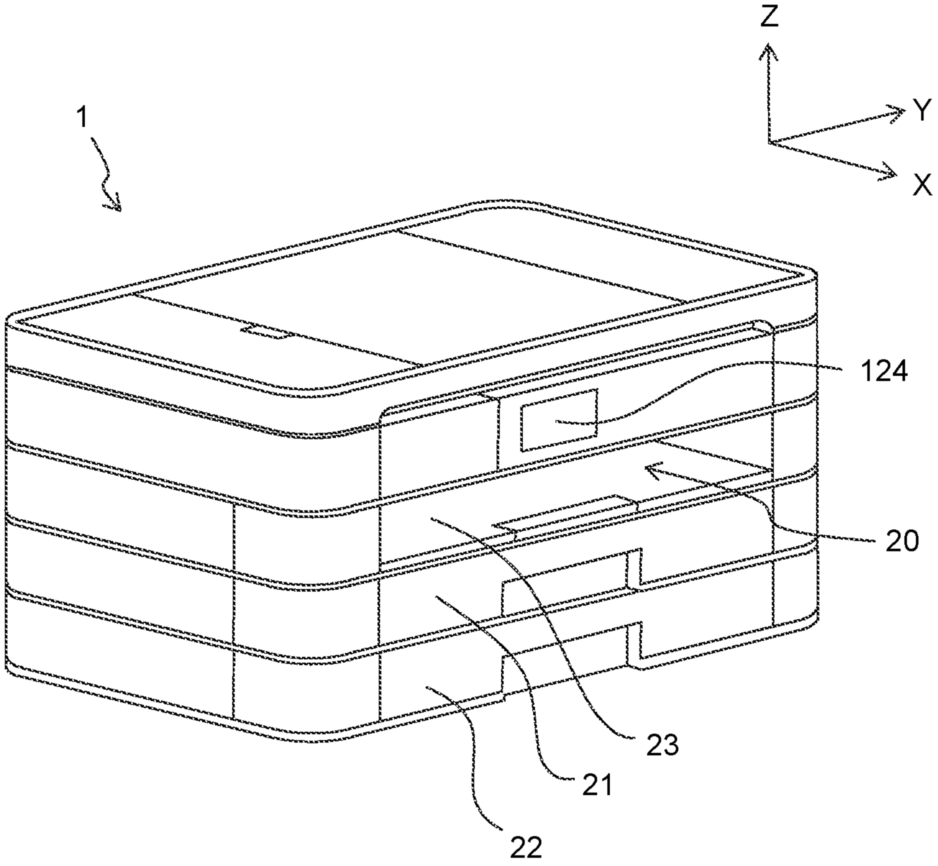
FIG. 1 is a drawing illustrative of an appearance of a printing apparatus according to a first embodiment of the present disclosure.
Figure 2:
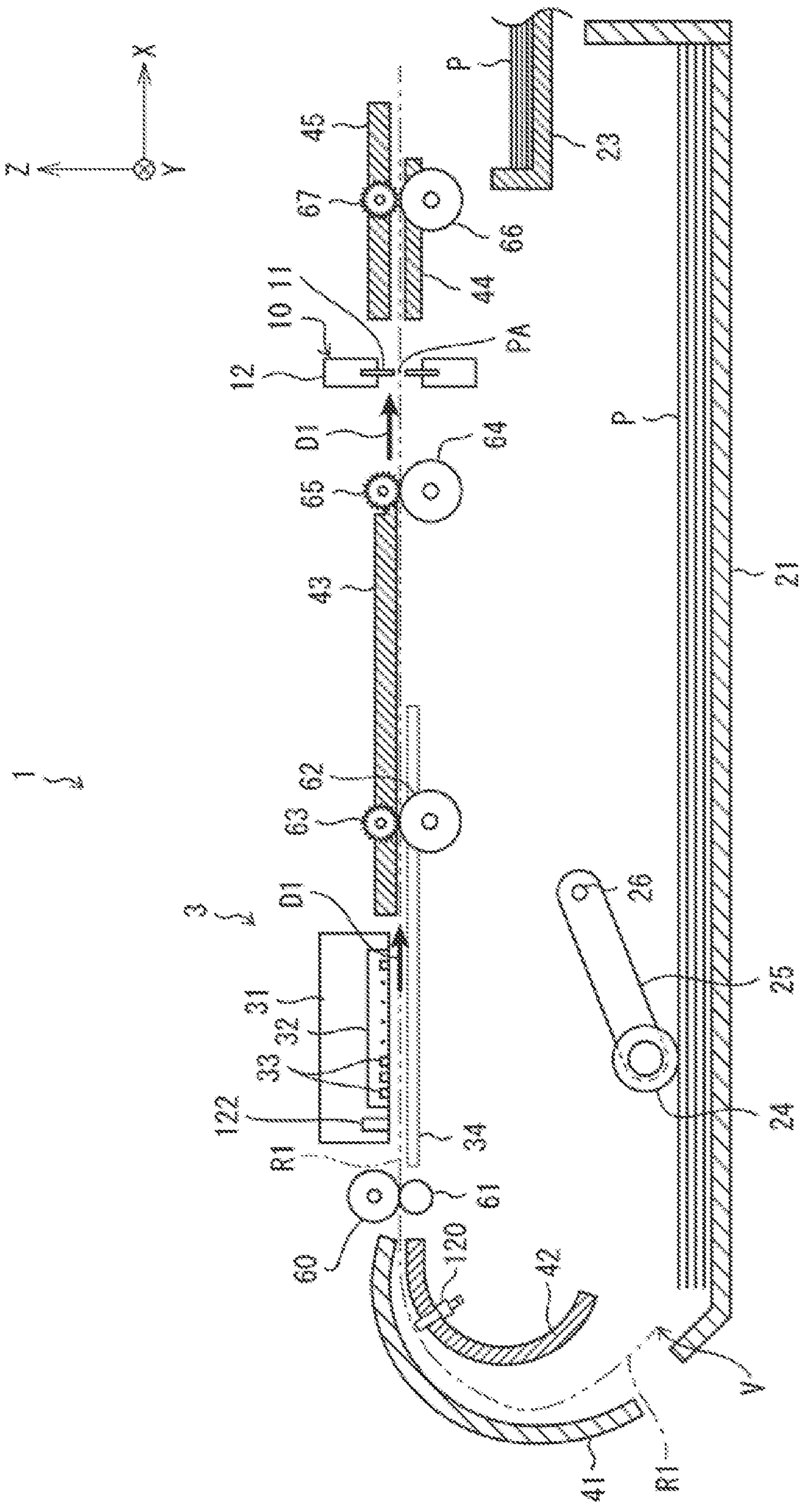
FIG. 2 is a sectional view illustrative of an internal structure of the printing apparatus depicted in FIG. 1.

The printing apparatus 1 depicted in FIG. 1 is MFP (Multi-Function Peripheral) provided with a plurality of functions including, for example, the print function, the scan function, the copy function, and the facsimile function. Note that as depicted in FIG. 2, the direction, which is directed from a printing unit 3 to a cutting unit 10 as an example of the processing unit, is designated as "X axis direction". The direction, which is directed from a feed tray 21 to the printing unit 3, is designated as "Z axis direction". The direction, which is orthogonal to both of the X axis direction and the Z axis direction, is designated as "Y axis direction".

The printing apparatus 1 is an ink-jet printer which performs the printing on the printing paper P as an example of the printing medium, for example, by ejecting the ink in accordance with the printing data designated by a printing job. It is also allowable that the printing apparatus 1 can perform the color printing. Alternatively, the printing apparatus 1 may be exclusively used for the monochrome or black and white printing. Further, the printing medium is not limited to the paper medium. The printing medium may be a resin medium including, for example, an OHP (Over Head Projector) sheet. Further, the printing apparatus 1 may be a laser printer which records an image on the printing paper P, for example, in accordance with the electrophotography system.

As depicted in FIG. 1, an opening 20 is formed on the front surface on the X axis forward direction (positive direction) side of the printing apparatus 1. Feed trays 21, 22 and a discharge tray 23 are detachably arranged in the opening 20. The feed trays 21, 22 are the trays which are provided in order to accommodate a plurality of sheets of the printing paper P, wherein the Z axis forward direction side is open. In an exemplary case depicted in FIG. 1, the two feed trays 21, 22 are arranged while being aligned in the Z axis direction.

As depicted in FIG. 2, the discharge tray 23 is arranged on the Z axis forward direction side of the feed tray 21. The discharge tray 23 is the tray which is provided in order to accommodate the printing paper P discharged by a conveyance roller 66, wherein the Z axis forward direction side is open. Note that in an exemplary case depicted in FIG. 2, the feed tray 22 is omitted from the illustration for the convenience of explanation.

Further, as depicted in FIG. 1, a receiving unit 124, which has a display screen, is provided on the front surface on the X axis forward direction side of the printing apparatus 1. The receiving unit 124 is composed of, for example, a touch panel. A user can make various settings in relation to the printing to be performed by the printing apparatus 1 by means of the touch operation with respect to the receiving unit 124. The information, which is set with the receiving unit 124, is outputted to a controller 100 depicted in FIG. 3.

As depicted in FIG. 2, the printing apparatus 1 is provided with a feed roller 24, a conveying passage R1, conveyance rollers 60, 62, 64, 66, a printing unit 3, and a cutting unit 10. In this case, the feed roller 24 and the conveyance rollers 60, 62, 64, 66 constitute an example of the conveying unit. Note that the number of respective rollers provided for the conveying passage R1 can be appropriately changed.

The feed roller 24 is the roller which is provided in order that the printing paper P, which is accommodated in the feed tray 21, is fed to the conveyance start position V of the conveying passage R1. The feed roller 24 is rotatably supported at a front end portion of a feed arm 25. The feed arm 25 is rotatably supported by a shaft 26 which is supported by a frame of the printing apparatus 1. The feed roller 24 makes the forward rotation in accordance with the driving of a feed motor 107 depicted in FIG. 3. In accordance with the forward rotation of the feed roller 24, the printing paper P, which is accommodated in the feed tray 21, is fed one by one to the conveyance start position V of the conveying passage R1.

The conveying passage R1 extends in the Z axis forward direction from the end portion on the X axis reverse direction (negative direction) side of the feed tray 21, and the conveying passage R1 curves in an area comparted by guide members 41, 42. Further, the conveying passage R1 extends in a straight form from the position of the printing unit 3 in an area comparted by guide members 43, 44, 45, and the conveying passage R1 arrives at the discharge tray 23.

The conveyance roller 60 is arranged on the upstream side in the conveying direction D1 from the printing unit 3 in the conveying passage R1. A pinch roller 61 is arranged at a position opposed to the lower portion of the conveyance roller 60. The conveyance roller 60 is driven by a conveyance motor 108 depicted in FIG. 3. The pinch roller 61 is rotated in accordance with the rotation of the conveyance roller 60. In accordance with the forward rotation of the conveyance roller 60 and the pinch roller 61, the printing paper P is conveyed to the printing unit 3 while being interposed by the conveyance roller 60 and the pinch roller 61.

The printing unit 3 is provided between the conveyance roller 60 and the conveyance roller 62 in the conveying passage R1. The printing unit 3 prints an image on the printing paper P conveyed in the conveying direction D1 by the conveyance rollers 60, 62, 64. The printing unit 3 has a carriage 31, a head 32, nozzles 33, and a platen 34.

The head 32 is carried on the carriage 31. The plurality of nozzles 33 are provided on the surface of the head 32 disposed on the Z axis reverse direction side. The head 32 ejects the ink from the nozzles 33. The platen 34 is the rectangular plate-shaped member on which the printing paper P is placed. The ink is selectively ejected from the nozzles 33 during the process in which the carriage 31 is moved with respect to the printing paper P supported by the platen 34. Thus, the printing is performed on the printing paper P.

Figure 3:
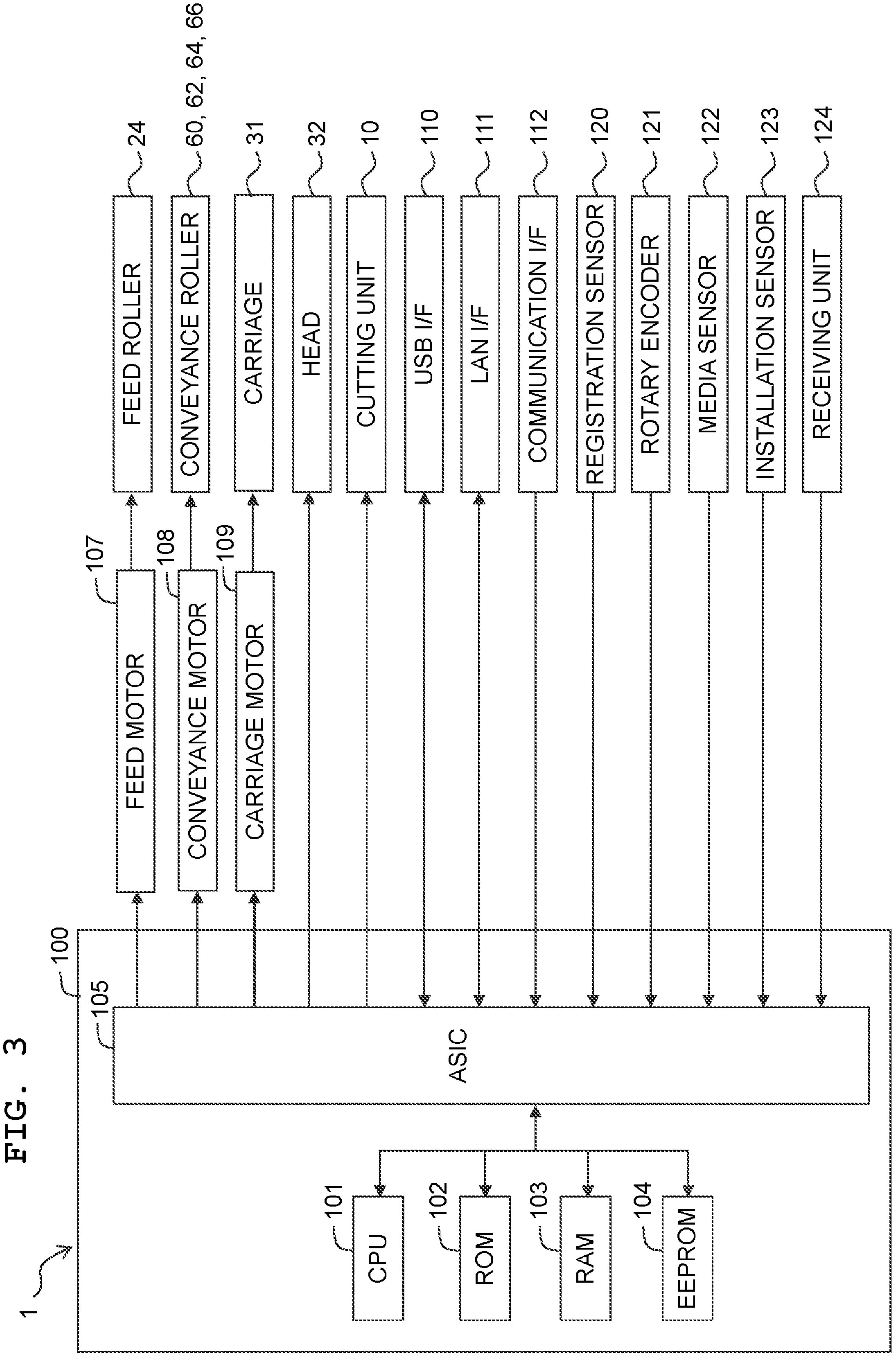
FIG. 3 is a block diagram illustrative of the electric configuration of the printing apparatus depicted in FIG. 2.

The driving force of a carriage motor 109 depicted in FIG. 3 is transmitted to the carriage 31. The carriage 31 is reciprocatively movable in the direction orthogonal to the conveying direction D1, i.e., in the widthwise direction of the printing paper P. The controller 100 allows the nozzles 33 to eject the ink therefrom while moving the carriage 31 in the widthwise direction of the printing paper P in a state in which the conveyance of the printing paper P is stopped. The controller 100 performs the printing on the printing paper P by repeating the printing process in which the printing corresponding to a predetermined number of lines (rows) is performed on the printing paper P and the line feed process in which the printing paper P is conveyed by a predetermined line feed amount by driving the conveyance rollers 60, 62.

As depicted in FIG. 2, the conveyance roller 62 is arranged on the downstream side in the conveying direction D1 from the printing unit 3 in the conveying passage R1. A spur roller 63 is arranged at a position opposed to the upper portion of the conveyance roller 62. The conveyance roller 62 is driven by the conveyance motor 108. The spur roller 63 is rotated in accordance with the rotation of the conveyance roller 62. In accordance with the forward rotation of the conveyance roller 62 and the spur roller 63, the printing paper P is conveyed to the downstream side in the conveying direction D1 while being interposed by the conveyance roller 62 and the spur roller 63.

Further, the conveyance roller 64 is arranged on the downstream side in the conveying direction D1 from the conveyance roller 62 in the conveying passage R1. A spur roller 65 is arranged at a position opposed to the upper portion of the conveyance roller 64. The conveyance roller 64 is driven by the conveyance motor 108. The spur roller 65 is rotated in accordance with the rotation of the conveyance roller 64. In accordance with the forward rotation of the conveyance roller 64 and the spur roller 65, the printing paper P is conveyed to the side of the cutting unit 10 while being interposed by the conveyance roller 64 and the spur roller 65.

The cutting unit 10 is arranged between the conveyance roller 64 and the conveyance roller 66 in the conveying passage R1. The cutting unit 10 is a well-known cutter mechanism. The cutting unit 10 executes the cutting action for cutting the printing paper P by moving blades 11 as an example of the processing member while contacting the printing paper P conveyed by the conveyance rollers 62, 64, 66, the image being printed on the printing paper P by the printing unit 3. The cutting action is an example of the processing action for processing the printing paper P.

Figure 5A:
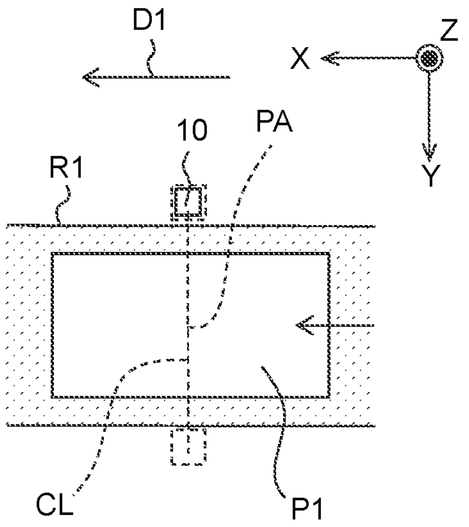
FIGS. 5A to 5D are schematic drawings illustrative of the cutting process and the conveying process for the printing paper in relation to the flow chart depicted in FIG. 4.

The cutting unit 10 has the pair of upper and lower blades 11 and a cutter carriage 12, and the cutting unit 10 cuts the printing paper P by means of the pair of upper and lower blades 11. Specifically, the cutting unit 10 moves the cutter carriage 12 in the widthwise direction of the printing paper P, and thus the cutting unit 10 cuts the printing paper P in the widthwise direction at the cutting position CL of the printing paper P by means of the pair of upper and lower blades 11. The cutting position CL is depicted in FIG. 5A.

Each of the pair of upper and lower blades 11 is a circular round tooth. In this case, each of the pair of round teeth is provided on the cutter carriage 12. Note that one blade 11 of the pair of upper and lower blades 11 may be a fixed tooth, and the other blade 11 may be a round tooth. In this case, the round tooth is provided on the cutter carriage 12, and the fixed tooth is fixed to the frame of the printing apparatus 1. Note that the cutting unit 10 may be configured to have only any one blade 11 of the upper and lower blades 11.

It is also allowable that the cutting unit 10 does not have the cutter carriage 12. In this case, the cutting unit 10 has a fixed tooth which extends in the Y axis direction and which is disposed on the upper side or the lower side of the conveying passage R1. The cutting unit 10 cuts the printing paper P in the widthwise direction at the cutting position CL of the printing paper P by moving the fixed tooth in the Z axis direction. The fixed tooth is an example of the processing member.

The conveyance roller 66 is arranged on the downstream side in the conveying direction D1 from the cutting unit 10 in the conveying passage R1. A spur roller 67 is arranged at a position opposed to the upper portion of the conveyance roller 66. The conveyance roller 66 is driven by the conveyance motor 108. The spur roller 67 is rotated in accordance with the rotation of the conveyance roller 66. In accordance with the forward rotation of the conveyance roller 66 and the spur roller 67, the printing paper P is conveyed by the conveyance roller 66, and the printing paper P is discharged to the discharge tray 23.

A registration sensor 120 is provided on the upstream side of the conveyance roller 60 in the conveying passage R1. The registration sensor 120 is the sensor which detects or senses the passage of the downstream end or the upstream end of the printing paper P through a contact position with respect to the conveyance roller 60. For example, an optical sensor or a sensor having an actuator which makes swinging movement in accordance with a contact of the printing paper P can be used as the registration sensor 120.

The conveyance roller 60 is provided with a rotary encoder 121 which detects the rotation of the conveyance roller 60. The rotary encoder 121 depicted in FIG. 3 outputs the pulse signal to the controller 100 in accordance with the rotation of the conveyance roller 60. The rotary encoder 121 has an encoder disk and an optical sensor. The encoder disk rotates in accordance with the rotation of the conveyance roller 60. The optical sensor reads the rotating encoder disk to generate the pulse signal. The generated pulse signal is outputted to the controller 100.

The printing unit 3 is provided with a media sensor 122. The media sensor 122 is the sensor which detects or senses whether or not the printing paper P is present on the platen 34. The media sensor 122 is used to detect or sense the arrival at the printing unit 3 of the downstream end of the printing paper P conveyed through the conveying passage R1.

Electric Configuration of Printing Apparatus 1

As depicted in FIG. 3, the printing apparatus 1 is provided with the controller 100, the feed motor 107, the conveyance motor 108, the carriage motor 109, a USB interface (I/F) 110, and a LAN interface (I/F) 111. Further, the printing apparatus 1 is provided with a communication interface (I/F) 112, the registration sensor 120, the rotary encoder 121, the media sensor 122, the installation sensor 123, and the receiving unit 124.

The controller 100 has CPU (Central Processing Unit) 101, ROM (Read Only Memory) 102, RAM (Random Access Memory) 103, EEPROM 104 (registered trademark), and ASIC 105. These components are connected by an internal bus 106.

Programs and the like are stored in ROM 102 in order to allow CPU 101 to control various operations. RAM 103 is used as a storage area for temporarily storing, for example, the data and the signals to be used when CPU 101 executes the program described above, or as a working area for the data processing. The controller 100 controls, for example, the feed motor 107, the conveyance motor 108, the carriage motor 109, the head 32, and the cutting unit 10 on the basis of the control program read from ROM 102.

The feed motor 107, the conveyance motor 108, the carriage motor 109, the head 32, the cutting unit 10, the USB interface 110, and the LAN interface 111 are connected to ASIC 105. Further, the communication interface 112, the registration sensor 120, the rotary encoder 121, the media sensor 122, the installation sensor 123, and the receiving unit 124 are connected to the ASIC 105.

ASIC 105 supplies the driving current to the feed motor 107, the conveyance motor 108, and the carriage motor 109. The controller 100 controls the rotation of the feed motor 107, the conveyance motor 108, and the carriage motor 109, for example, by means of the PWM (Pulse Width Modulation) control.

Further, the controller 100 allows the nozzles 33 to eject the ink therefrom by applying the driving voltage to the vibration element of the head 32. The controller 100 detects or senses the state of the printing apparatus 1 on the basis of the signals outputted from the registration sensor 120, the rotary encoder 121, the media sensor 122, and the installation sensor 123.

The registration sensor 120 outputs the ON signal in a state in which the printing paper P passes through the position of the registration sensor 120. The registration sensor 120 outputs the OFF signal in a state in which the printing paper P does not pass through the position of the registration sensor 120. In other words, the registration sensor 120 outputs the ON signal during the period ranging from the timing at which the downstream end of the printing paper P arrives at the position of the registration sensor 120 to the passage of the upstream end of the printing paper P through the position of the registration sensor 120. The registration sensor 120 outputs the OFF signal during the period other than the above. The detection signal obtained by the registration sensor 120 is outputted to the controller 100.

The installation sensor 123 is provided for each of the feed trays 21, 22 to detect whether or not each of the feed trays 21, 22 is installed to the printing apparatus 1. The installation sensor 123 outputs the ON signal to the controller 100 in a state in which each of the feed trays 21, 22 is installed to the printing apparatus 1. The installation sensor 123 outputs the OFF signal to the controller 100 in a state in which each of the feed trays 21, 22 is not installed to the printing apparatus 1.

For example, a USB (Universal Serial Bus) memory or a USB cable is connected to the USB interface 110. PC (Personal Computer) is connected to the LAN interface 111 via a LAN (Local Area Network) cable. If the controller 100 receives the printing job via the USB interface 110 or the LAN interface 111, the printing data designated by the printing job is printed on the printing paper P by controlling the respective components of the printing apparatus 1.

Cutting Process and Conveying Process Executed by Printing Apparatus 1

An explanation will be made with reference to FIG. 4 to FIG. 9 about the cutting process and the conveying process executed by the printing apparatus 1. Note that in the explanation relevant to FIG. 4 to FIG. 9, the printing paper P, for which the cutting action is executed, is referred to as "printing paper P1", and the printing paper P, which is to be conveyed continuously to the printing paper P1 for which the cutting action has been executed, is referred to as "printing paper P2".

The printing paper P1, on which the image is printed by the printing unit 3, is conveyed by the controller 100 to the position of the cutting unit 10 by means of the conveyance rollers 62, 64, 66 (S1). Specifically, as depicted in FIG. 5A, the controller 100 conveys the printing paper P1 by means of the conveyance rollers 62, 64, 66 so that the cutting position CL in the conveying direction D1 of the printing paper P1 is positioned in the course (path) PA along which the cutting unit 10 moves.

Figure 5B:
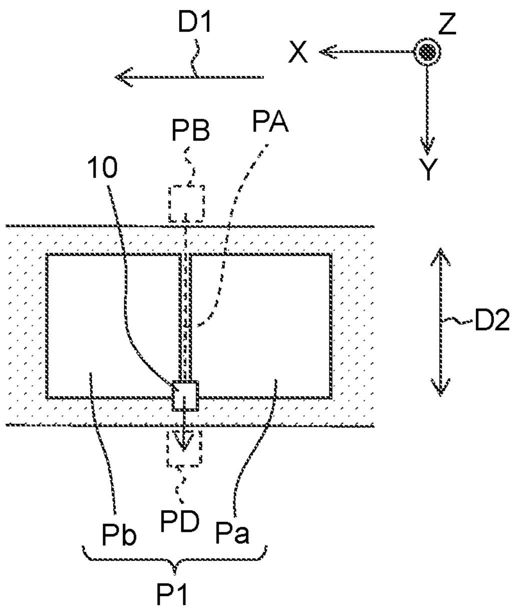

The controller 100 executes the cutting process for performing the cutting action with respect to the printing paper P by means of the cutting unit 10 after conveying the printing paper P1 by means of the conveyance rollers 62, 64, 66 (S2). Specifically, as depicted in FIG. 5B, the controller 100 cuts the printing paper P1 by moving the cutting unit 10 from the first position PB to the second position PD in the intersecting direction D2 which intersects with the conveying direction D1. The cutting process is an example of the processing process in which the processing action is executed for the printing paper P1.

The intersecting direction D2 is, for example, the Y axis direction which is orthogonal to the conveying direction D1. However, there is no limitation thereto. The intersecting direction D2 may be, for example, the Z axis direction. The first position PB is the waiting position at which the cutting unit 10 waits. The second position PD is the position of the change of direction at which the direction of movement of the cutting unit 10 is changed to the opposite direction. The first position PB and the second position PD are the positions which are mutually aligned in the Y axis direction. The first position PB and the second position PD may be changed depending on the width size of the printing paper P1. The printing paper P1 is divided into the first printing paper Pa and the second printing paper Pb by being cut by the cutting unit 10.

Note that when the intersecting direction D2 is the Z axis direction, the controller 100 cuts the printing paper P1 by moving the cutting unit 10 from the first position to the second position. In this case, the first position and the second position are the positions which are mutually aligned in the Z axis direction.

The controller 100 cuts the printing paper P1 by means of the cutting unit 10, and then the controller 100 determines whether or not the printing paper P2, which is to be conveyed continuously to the printing paper P1 having been subjected to the execution of the cutting action, is present, on the basis of the printing job (S3). Note that the controller 100 may determine whether or not the printing paper P2, which is to be conveyed continuously to the printing paper P1 having been subjected to the execution of the cutting action, is present, by using at least one of the registration sensor 120 and the media sensor 122.

Figure 5C:
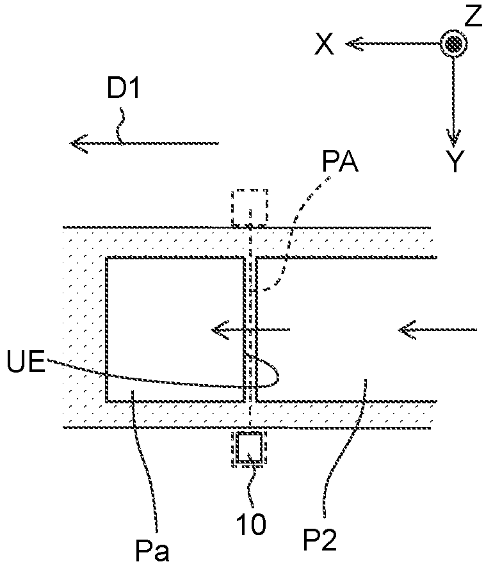

Consideration is made for the case in which the controller 100 determines that the printing paper P2, which is to be conveyed continuously to the printing paper P1 having been subjected to the execution of the cutting action, is present (S3: YES). In this case, as depicted in FIG. 5C, the controller 100 conveys the first printing paper Pa, the second printing paper Pb, and the printing paper P2 by means of the conveyance rollers 62, 64, 66 so that the course PA is positioned between the first printing paper Pa and the printing paper P2 to be conveyed continuously to the first printing paper Pa (S4).

In Step S4, the controller 100 executes the first conveying process for conveying the first printing paper Pa and the second printing paper Pb in the conveying direction D1 by means of the conveyance rollers 62, 64, 66 until the upstream end UE in the conveying direction D1 of the first printing paper Pa moves to the downstream from the cutting unit 10. Further, the controller 100 executes the third conveying process for conveying the printing paper P2 to be conveyed continuously to the first printing paper Pa by means of the conveyance rollers 62, 64, 66.

Further, in Step S4, the controller 100 executes the first conveying process and the third conveying process so that the first conveying speed of the first printing paper Pa and the second printing paper Pb is faster than the second conveying speed of the printing paper P2 to be conveyed continuously to the first printing paper Pa. In this case, the controller 100 operates such that the rotation speed of the conveyance roller which contacts the first printing paper Pa and the second printing paper Pb is faster than the rotation speed of the conveyance roller which contacts the printing paper P2, in relation to the conveyance rollers 62, 64, 66 by means of the conveyance motor 108.

Accordingly, the distance is increased between the first printing paper Pa and the printing paper P2. Therefore, the controller 100 can easily move the cutting unit 10 from the second position PD to the first position PB in Step S5 described later on.

Figure 5D:
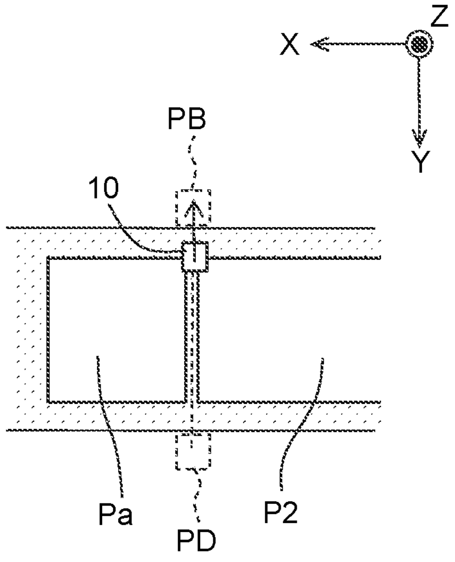

The controller 100 executes the foregoing first conveying process and the foregoing third conveying process. After that, as depicted in FIG. 5D, the controller 100 executes the first moving process for moving the cutting unit 10 from the second position PD to the first position PB (S5). As described above, the course PA, along which the cutting unit 10 moves, is positioned between the first printing paper Pa and the printing paper P2 to be conveyed continuously to the first printing paper Pa. Therefore, the cutting unit 10 can be moved from the second position PD to the first position PB so that the cutting unit 10 does not contact the first printing paper Pa and the printing paper P2.

After Step S5, the controller 100 discharges the first printing paper Pa and the second printing paper Pb to the discharge tray 23 by means of the conveyance rollers 62, 64, 66, and the controller 100 conveys the next printing paper P2 by means of the conveyance rollers 62, 64, 66 (S6). After Step S6, the controller 100 proceeds to the process of Step S1.

On the other hand, if the controller 100 determines that the printing paper P2, which is to be conveyed continuously to the printing paper P1 having been subjected to the execution of the cutting action, is absent (S3: NO), the controller 100 discharges the first printing paper Pa and the second printing paper Pb to the discharge tray 23 by means of the conveyance rollers 62, 64, 66 (S7). In other words, the controller 100 discharges the second printing paper Pb to the discharge tray 23 by means of the conveyance roller 66, and the controller 100 discharges the first printing paper Pa to the discharge tray 23 by means of the conveyance rollers 62, 64, 66.

The controller 100 discharges the first printing paper Pa and the second printing paper Pb to the discharge tray 23 by means of the conveyance rollers 62, 64, 66, and then the controller 100 executes the first moving process for moving the cutting unit 10 from the second position PD to the first position PB in the same manner as Step S5 (S8).

As explained above, the printing apparatus 1 conveys the printing paper P1 for which the cutting action has been executed, and then the printing apparatus 1 moves the cutting unit 10 from the second position PD to the first position PB. On this account, it is possible to shorten the processing time as compared with such a case that the printing apparatus 1 moves the cutting unit 10 from the second position PD to the first position PB before the printing apparatus 1 conveys the printing paper P1 for which the cutting action has been executed. Specifically, it is possible to shorten the time required until the conveyance is started for the second printing paper Pb disposed downstream from the cutting unit 10 toward the downstream of the cutting unit 10 after allowing the cutting unit 10 to cut the printing paper P1, by the period of time required for the movement of the cutting unit 10 from the second position PD to the first position PB.

SECOND EMBODIMENT

Figure 6:
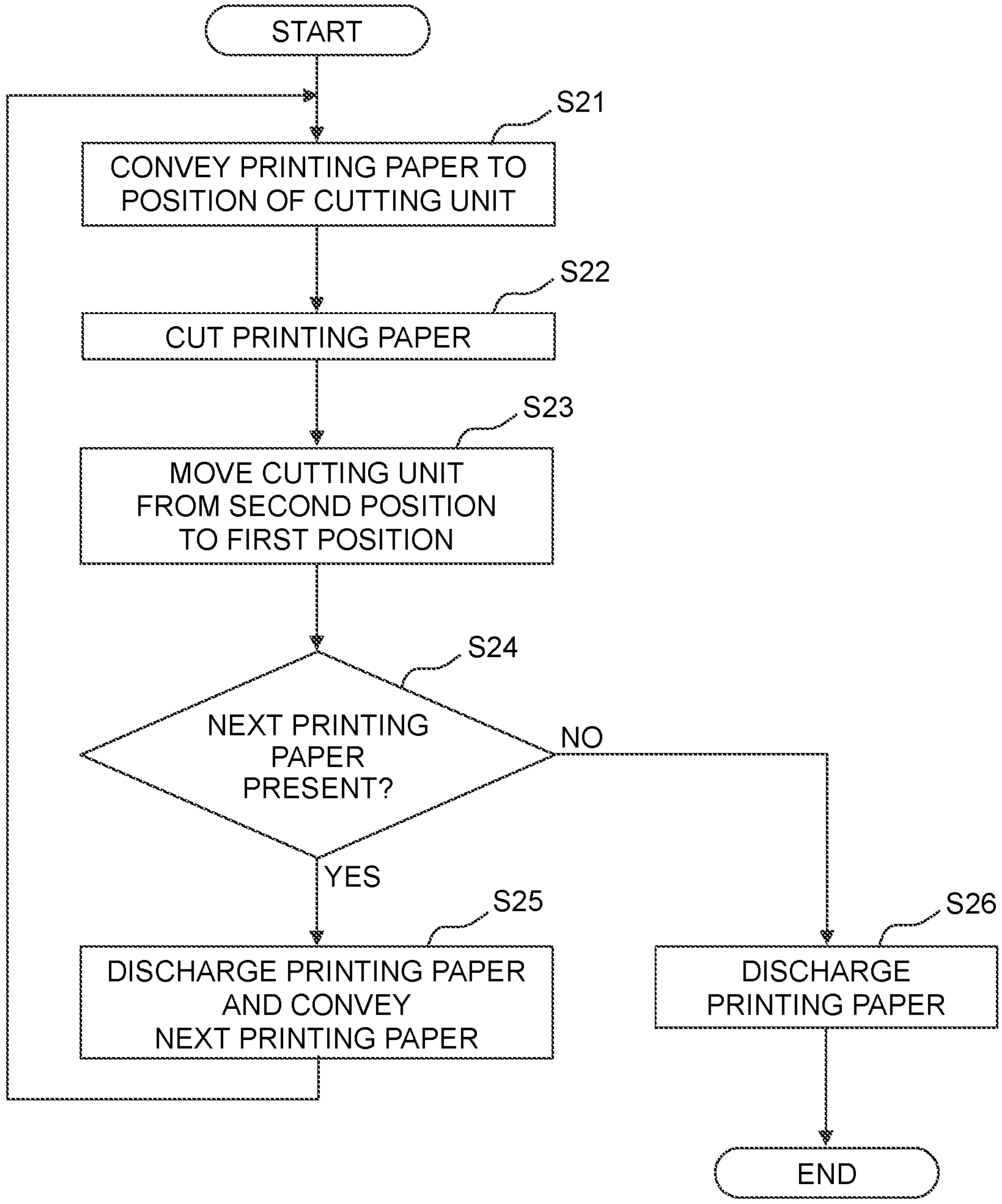
FIG. 6 is a flow chart illustrative of a cutting process and a conveying process for the printing paper executed by a printing apparatus according to a second embodiment of the present disclosure.
Figure 7A:
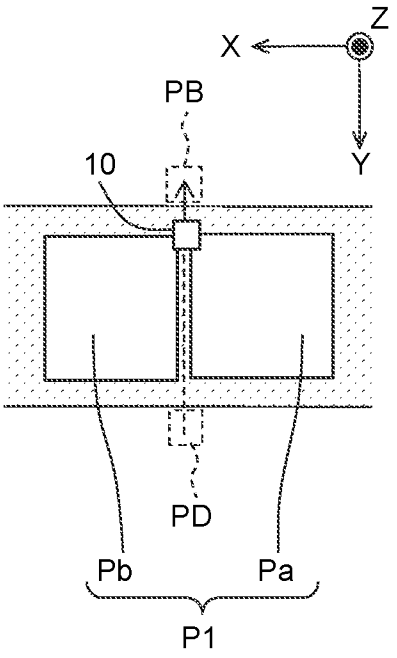
FIGS. 7A to 7D are schematic drawings illustrative of the cutting process and the conveying process for the printing paper P.
Figure 7B:
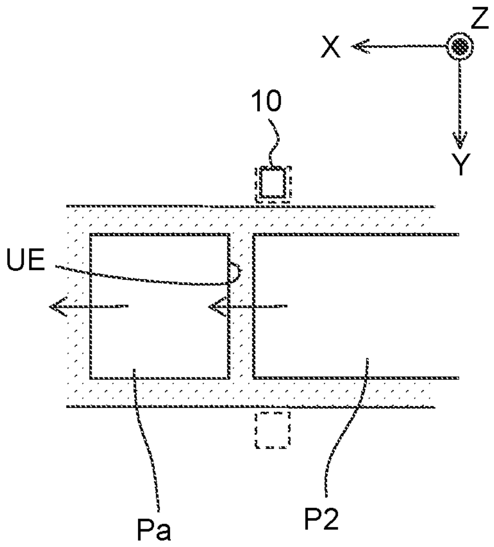

A second embodiment of the present disclosure will be explained with reference to FIG. 6 to FIG. 7B. Note that the members, which have the same functions as those of the members explained in the first embodiment, are designated by the same reference numerals, and any explanation thereof is not repeated.

Figure 4:
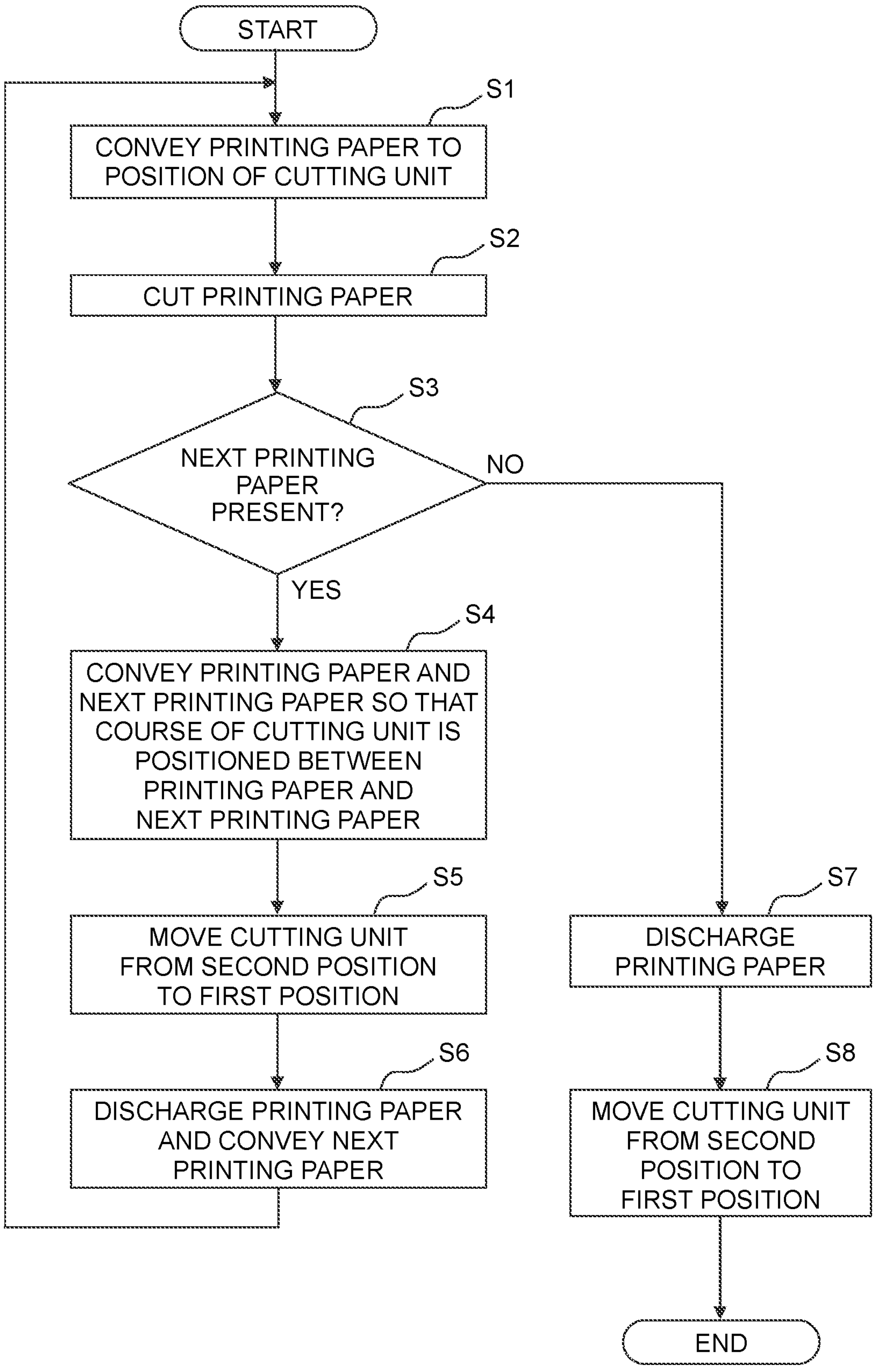
FIG. 4 is a flow chart illustrative of a cutting process and a conveying process for the printing paper executed by the printing apparatus depicted in FIG. 1.

The controller 100 conveys the printing paper P1 on which the image is printed by the printing unit 3, to the position of the cutting unit 10 by means of the conveyance rollers 62, 64, 66 (S21) in the same manner as Step S1 depicted in FIG. 4. The controller 100 conveys the printing paper P1 by means of the conveyance rollers 62, 64, 66, and then the controller 100 executes the cutting process for performing the cutting action with respect to the printing paper P1 by means of the cutting unit 10 (S22) in the same manner as Step S2.

The controller 100 cuts the printing paper P1 by means of the cutting unit 10. After that, as depicted in FIG. 7A, the controller 100 executes the second moving process for moving the cutting unit 10 from the second position PD to the first position PB (S23). The controller 100 executes the foregoing second moving process, and then the controller 100 determines whether or not the printing paper P2, which is to be conveyed continuously to the printing paper P1 having been subjected to the execution of the cutting action, is present (S24) in the same manner as Step S3 depicted in FIG. 4.

Consideration is made for the case in which the controller 100 determines that the printing paper P2, which is to be conveyed continuously to the printing paper P1 having been subjected to the execution of the cutting action, is present (S24: YES). In this case, the controller 100 conveys the first printing paper Pa and the second printing paper Pb in the conveying direction D1 by means of the conveyance rollers 62, 64, 66, and the controller 100 executes the second conveying process for conveying the printing paper P2 to be conveyed continuously to the first printing paper Pa by means of the conveyance rollers 62, 64, 66 (S25).

Specifically, the controller 100 conveys the second printing paper Pb in the conveying direction D1 by means of the conveyance roller 66 so that the second printing paper Pb is discharged to the discharge tray 23. Further, as depicted in FIG. 7B, the controller 100 conveys the first printing paper Pa in the conveying direction D1 by means of the conveyance roller 66 until the upstream end UE of the first printing paper Pa moves to the downstream from the cutting unit 10. Further, the controller 100 conveys the printing paper P2 to be conveyed continuously to the first printing paper Pa by means of the conveyance rollers 62, 64, 66.

On the other hand, if it is determined that the printing paper P2 is absent (S24: NO), the controller 100 discharges the first printing paper Pa and the second printing paper Pb to the discharge tray 23 by means of the conveyance rollers 62, 64, 66 (S26).

THIRD EMBODIMENT

Figure 7C:
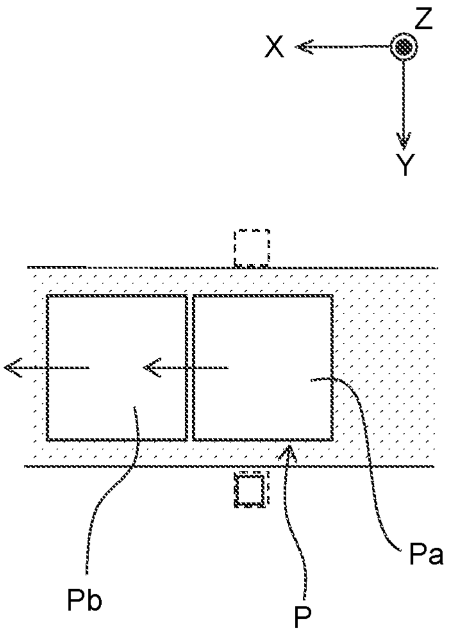

A third embodiment of the present disclosure will be explained with reference to FIG. 7C to FIG. 8. Note that the members, which have the same functions as those of the members explained in the first and second embodiments, are designated by the same reference numerals, and any explanation thereof is not repeated.

The controller 100 conveys the printing paper P1 on which the image is printed by the printing unit 3, to the position of the cutting unit 10 by means of the conveyance rollers 62, 64, 66 (S31) in the same manner as Step S1 depicted in FIG. 4. The controller 100 conveys the printing paper P1 by means of the conveyance rollers 62, 64, 66, and then the controller 100 executes the cutting process for executing the cutting action with respect to the printing paper P1 by means of the cutting unit 10 (S32) in the same manner as Step S2 depicted in FIG. 4.

The controller 100 cuts the printing paper P1 by means of the cutting unit 10, and then the controller 100 determines whether or not the cutting action is executed for the printing paper P1 on which the image of the printing data of the final page included in the printing job is printed by the printing unit 3 on the basis of the printing job (S33).

If the controller 100 determines that the cutting action is executed for the printing paper P1 on which the image of the printing data of any page other than the final page included in the printing job is printed by the printing unit 3 (S33: NO), the controller 100 executes the second moving process for moving the cutting unit 10 from the second position PD to the first position PB (S34) in the same manner as Step S23 depicted in FIG. 6. After the second moving process described above, the controller 100 executes the second conveying process (S35) in the same manner as Step S25 depicted in FIG. 6.

On the other hand, if the controller 100 determines that the cutting action is executed for the printing paper P1 on which the image of the printing data of the final page included in the printing job is printed by the printing unit 3 (S33: YES), then the controller 100 executes the first moving process in the same manner as Step S4, and thus the controller 100 discharges the first printing paper Pa and the second printing paper Pb to the discharge tray 23 (S36). Specifically, as depicted in FIG. 7C, the controller 100 discharges the first printing paper Pa and the second printing paper Pb to the discharge tray 23.

Figure 7D:
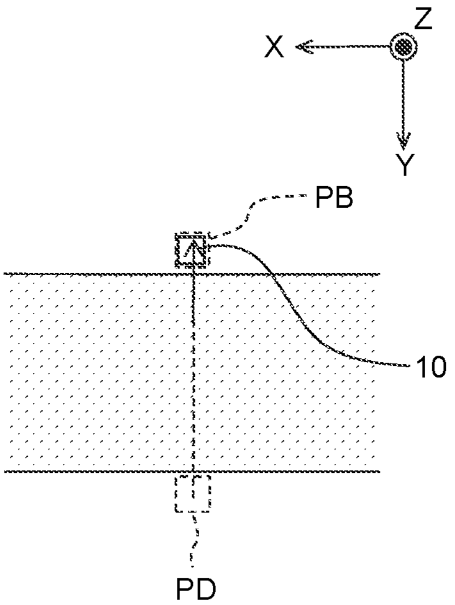

The controller 100 executes the first moving process for moving the cutting unit 10 from the second position PD to the first position PB (S37) as depicted in FIG. 7D in the same manner as Step S5 depicted in FIG. 4 after the foregoing first conveying process.

As described above, if the image of the printing data of any page other than the final page is printed on the printing paper P1, i.e., if the printing paper P2 to be conveyed next is present, then the controller 100 moves the cutting unit 10 from the second position PD to the first position PB, and then the controller 100 conveys the first printing paper Pa and the second printing paper Pb. Further, the controller 100 conveys the printing paper P2 to be conveyed continuously to the first printing paper Pa.

Accordingly, the cutting unit 10 has already returned to the first position PB. On this account, it is unnecessary to move the cutting unit 10 from the second position PD to the first position PB between the first printing paper Pa and the printing paper P2 to be conveyed next. Therefore, the distance between the first printing paper Pa and the printing paper P2 to be conveyed next can be advantageously set with respect to the conveyance time irrelevant to the movement timing of the cutting unit 10 during the conveyance performed by the conveying unit.

Further, the present disclosure is also applicable to a printing apparatus provided with such a double-sided conveying route (passage) that the conveying route (passage) is branched from the conveying passage R1 in the vicinity of the conveyance roller 64, and the conveying route (passage) merges again into the conveying passage R1 at the conveyance start position V. The double-sided conveying route (passage) is the route along which the printing paper P is conveyed in order to print images on the both surfaces of the printing paper P.

FOURTH EMBODIMENT

A fourth embodiment of the present disclosure will be explained below. Note that the members, which have the same functions as those of the members explained in the first to third embodiments, are designated by the same reference numerals, and any explanation thereof is not repeated.

Figure 8:
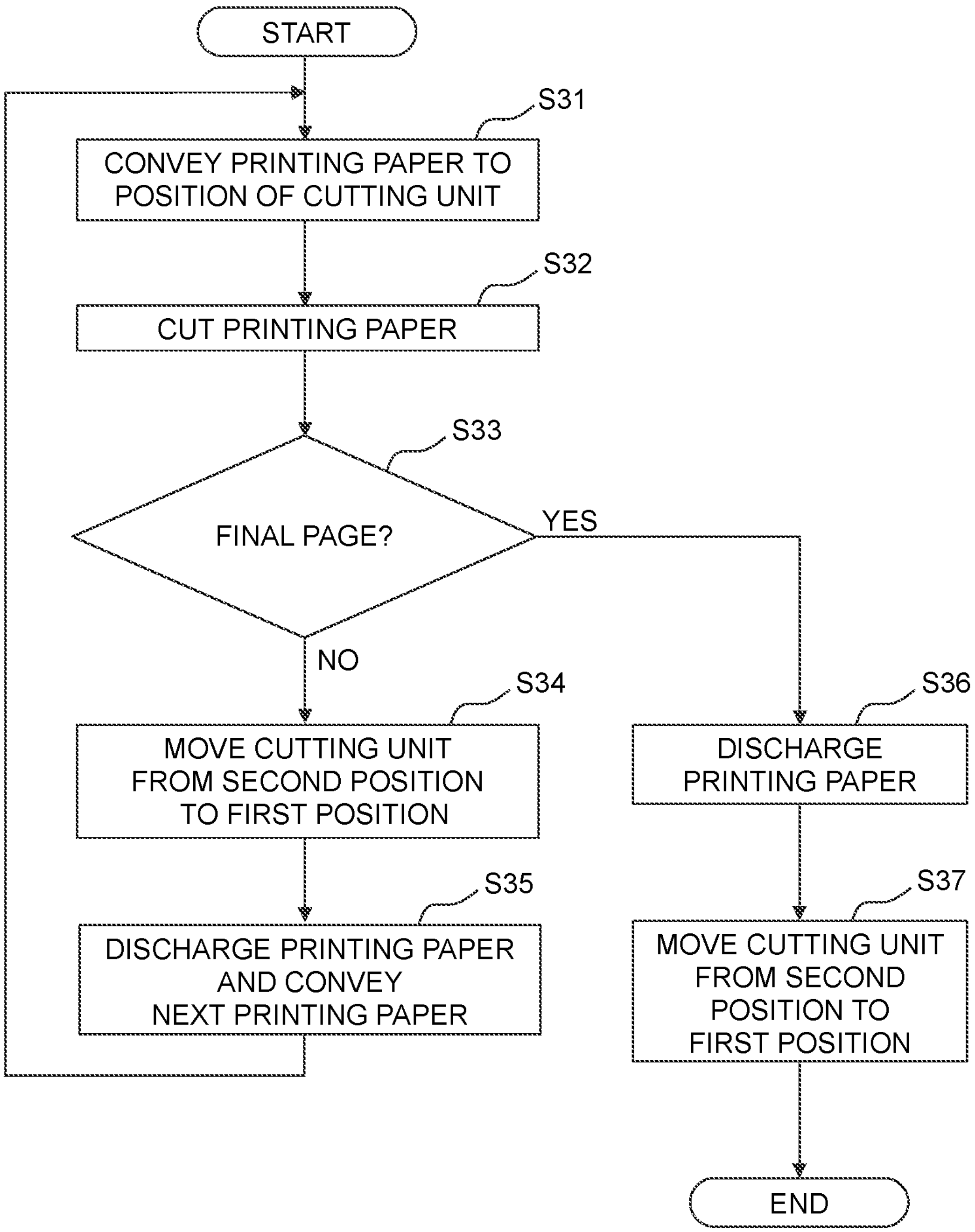
FIG. 8 is a flow chart illustrative of a cutting process and a conveying process for the printing paper executed by a printing apparatus according to a third embodiment of the present disclosure.

The controller 100 may determine whether a first predetermined condition or a second predetermined condition is fulfilled, in place of Step S33 depicted in FIG. 8. If the first predetermined condition is fulfilled, the controller 100 executes the process of Step S37 after executing the process of Step S36. If the second predetermined condition, which is different from the first predetermined condition, is fulfilled, the controller 100 executes the process of Step S35 after executing the process of Step S34. Accordingly, it is possible to switch the order of execution of the process for conveying the printing paper P1 having been subjected to the execution of the cutting action and the process for moving the cutting unit 10, depending on the condition.

Note that in the fourth embodiment, if the printing paper P2, which is to be conveyed continuously to the printing paper P1 having been subjected to the execution of the cutting action, is present after Step S34, the controller 100 executes the same process as that of Step S35. If the printing paper P2 is absent after Step S34, the controller 100 discharges the printing paper P1 having been subjected to the execution of the cutting action to the discharge tray 23 by means of the conveyance rollers 62, 64, 66 in the same manner as Step S7 depicted in FIG. 4.

Further, if the first predetermined condition is fulfilled, and the printing paper P2, which is to be conveyed continuously to the printing paper P1 having been subjected to the execution of the cutting action, is present, then the controller 100 successively executes the same processes as those of Steps S4 to S6 depicted in FIG. 4. If the first predetermined condition is fulfilled, and the printing paper P2 is absent, then the controller 100 successively executes the same processes as those of Steps S36 and S37. First to sixth examples of the first predetermined condition and the second predetermined condition will be explained below.

First Examples of First Predetermined Condition and Second Predetermined Condition The first predetermined condition may be such a condition that the resolution of the image printed on the printing paper P1 by the printing unit 3 is not less than a predetermined resolution. In this case, the second predetermined condition is such a condition that the resolution of the image printed on the printing paper P1 by the printing unit 3 is less than the predetermined resolution. The controller 100 determines whether the first predetermined condition or the second predetermined condition is fulfilled by comparing the resolution of the image of the printing data included in the printing job and the predetermined resolution stored in EEPROM 104.

If the first predetermined condition is fulfilled, the controller 100 executes the first moving process after executing the first conveying process and the third conveying process so that the course PA is positioned between the printing paper P1 having been subjected to the execution of the cutting action and the printing paper P2 to be conveyed continuously to the printing paper P1.

If the image is being printed on the printing paper P1 by the printing unit 3, the printing paper P1 is conveyed by every predetermined conveyance amount by the conveyance rollers 60, 62, 64. If the resolution of the image is high, the predetermined conveyance amount becomes small as compared with the case in which the resolution of the image is low. Accordingly, the printing paper P1 and the printing paper P2 are conveyed little by little. Therefore, it is easy to realize such configuration that the printing paper P1 and the printing paper P2 are conveyed so that the course PA, along which the cutting unit 10 moves, is positioned between the printing paper P1 having been subjected to the execution of the cutting action and the printing paper P2 to be conveyed continuously to the printing paper P1.

Second Examples of First Predetermined Condition and Second Predetermined Condition The first predetermined condition may be such a condition that the number of dots formed per unit area of the surface of the printing paper P1 by the printing unit 3 is not less than a predetermined number of dots. In this case, the second predetermined condition is such a condition that the number of dots formed per unit area of the surface of the printing paper P1 by the printing unit 3 is less than the predetermined number of dots.

If the printing apparatus 1 is an ink-jet printer, the number of dots formed on the surface of the printing paper P1 is the number of ink droplets ejected from the nozzles 33. If the printing apparatus 1 is a laser printer, the number of dots formed on the surface of the printing paper P1 is the number of dots of the toner transferred to the printing paper P1 from a photosensitive drum provided for the printing apparatus 1. The controller 100 determines whether the first predetermined condition or the second predetermined condition is fulfilled, by comparing the number of dots indicated by the printing data included in the printing job with the predetermined number of dots stored in EEPROM 104.

If the number of dots formed on the printing paper P1 is large, there is such a possibility that any wrinkle may appear on the printing paper P1 having been subjected to the execution of the cutting action. In this case, the controller 100 allows the cutting unit 10 to move from the second position PD to the first position PB after conveying the printing paper P1 having been subjected to the execution of the cutting action. Thus, it is possible to prevent the cutting unit 10 from suffering any load exerted by the wrinkle which appears on the printing paper P1.

Third Examples of First Predetermined Condition and Second Predetermined Condition The first predetermined condition may be such a condition that the amount of the ink ejected per unit area of the surface of the printing paper P1 by the printing unit 3 is not less than a predetermined amount of the ink. In this case, the second predetermined condition is such a condition that the amount of the ink ejected per unit area of the surface of the printing paper P1 by the printing unit 3 is less than the predetermined amount of the ink.

If the printing apparatus 1 is an ink-jet printer, the amount of the ink ejected to the surface of the printing paper P1 is the amount of the ink ejected from the nozzles 33 to the surface of the printing paper P1. The controller 100 determines whether the first predetermined condition or the second predetermined condition is fulfilled, by comparing the amount of the ink indicated by the printing data included in the printing job with the predetermined amount of the ink stored in EEPROM 104.

If the amount of the ink ejected to the printing paper P1 is large, there is such a possibility that any wrinkle may appear on the printing paper P1 having been subjected to the execution of the cutting action. In this case, the controller 100 allows the cutting unit 10 to move from the second position PD to the first position PB after conveying the printing paper P1 having been subjected to the execution of the cutting action. Thus, it is possible to prevent the cutting unit 10 from suffering any load exerted by the wrinkle which appears on the printing paper P1.

Fourth Examples of First Predetermined Condition and Second Predetermined Condition The receiving unit 124 may receive an operation of a user for selecting one of a first mode for executing the first moving process after the first conveying process and a second mode for executing the second conveying process after the second moving process. In this case, the first predetermined condition is such a condition that selection of the first mode is received by the receiving unit 124, and the second predetermined condition is such a condition that selection of the second mode is received by the receiving unit 124.

Accordingly, the user can easily switch the movement timing of the cutting unit 10, while confirming the state of the printing paper P1 having been subjected to the execution of the cutting action. Note that in place of the receiving unit 124, the USB interface 110 or the LAN interface 111 may function as a receiving unit for receiving, from PC, an operation of a user for PC for selecting one of the first mode and the second mode.

Fifth Examples of First Predetermined Condition and Second Predetermined Condition The first predetermined condition and the second predetermined condition may be such conditions that an environment around the printing apparatus 1 is limited. For example, the first predetermined condition may be such a condition that a humidity, which is detected by a humidity sensor provided for the printing apparatus 1 for detecting the humidity around the printing apparatus 1, is not less than a predetermined humidity. In this case, the second predetermined condition is such a condition that the humidity, which is detected by the humidity sensor, is less than the predetermined humidity.

The controller 100 determines which predetermined condition of the first predetermined condition and the second predetermined condition is fulfilled, by comparing the humidity detected by the humidity sensor with the predetermined humidity stored in EEPROM 104.

In this case, it is possible to appropriately switch the movement timing of the cutting unit 10 on the basis of the surrounding environment. Further, when the humidity around the printing apparatus 1 is high, any wrinkle easily appears on the printing paper P1. Owing to the first predetermined condition and the second predetermined condition which are the conditions as described above, it is possible to prevent the cutting unit 10 from suffering any load exerted by the wrinkle which appears on the printing paper P1.

Sixth Examples of First Predetermined Condition and Second Predetermined Condition The first predetermined condition and the second predetermined condition may be such conditions that a type of the printing medium is specified. For example, the first predetermined condition may be such a condition that the type of the printing medium falls under any one of predetermined types of the printing medium. In this case, the second predetermined condition is such a condition that the type of the printing medium does not fall under any one of the predetermined types of the printing medium.

Specifically, the controller 100 confirms under which predetermined type of the printing medium stored in EEPROM 104 the type of the printing medium received by the receiving unit 124 falls. Accordingly, the controller 100 determines whether the first predetermined condition or the second predetermined condition is fulfilled. Note that the controller 100 may confirm under which predetermined type of the printing medium stored in EEPROM 104 the type of the printing medium set in the printing job falls.

In this case, it is possible to appropriately switch the movement timing of the cutting unit 10 on the basis of the type of the printing medium. Further, when the type of the printing medium is a specified type, the material of the printing medium is hard in some cases. Owing to the first predetermined condition and the second predetermined condition which are the conditions as described above, it is possible to prevent the cutting unit 10 from suffering any load exerted by the printing medium which is composed of the hard material.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

First Modification

In the printing apparatus 1 described above, the printing paper P1 is divided into a plurality of pieces by cutting the printing paper P1 by means of the cutting unit 10. However, there is no limitation thereto. In place of the cutting unit 10, the printing apparatus 1 may be provided with a processing unit for executing the perforation-forming processing for the printing paper P1. In this case, the controller 100 executes the processing process for executing the perforation-forming processing at the processing position of the printing paper P1 with respect to the printing paper P1 by means of the processing unit. The processing position is the same position as the cutting position CL.

Specifically, the processing unit has a perforation cutter which has blades formed at equal intervals on a circumference of a disk, and a cutter carriage 12. The processing unit forms the perforation on the printing paper P1 by moving the cutter carriage 12 in the widthwise direction of the printing paper P1 and forming a plurality of cutouts while providing intervals along with the processing position of the printing paper P1 by means of the perforation cutter which is an example of the processing member. The perforation-forming processing is an example of the processing action for processing the printing paper P1.

Second Modification

Figure 9:
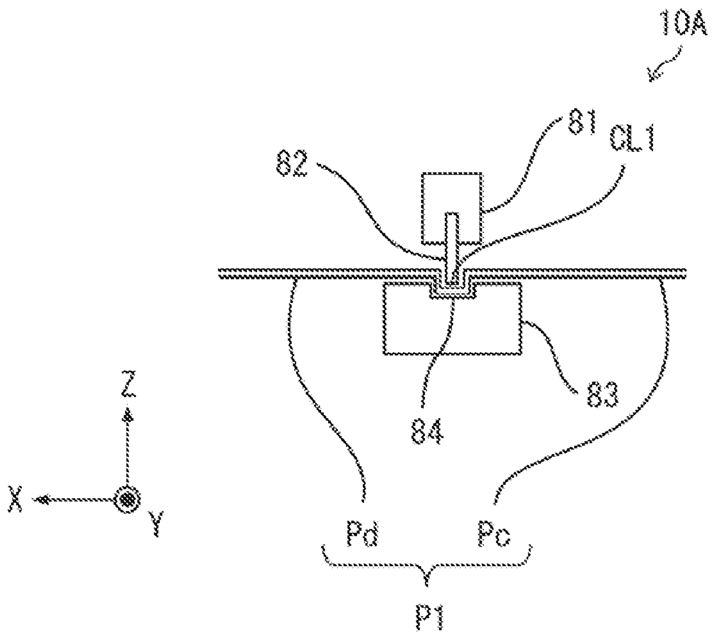
FIG. 9 is a drawing illustrative of configuration of a processing unit as a modification of a cutting unit provided for the printing apparatus according to the first embodiment of the present disclosure.

As depicted in FIG. 9, in place of the cutting unit 10, the printing apparatus 1 may be provided with a processing unit 10A for executing the crease-forming processing with respect to the printing paper P1. In this case, the controller 100 performs the processing process for executing the crease-forming processing at a processing position CL1 of the printing paper P1 with respect to the printing paper P1 by means of the processing unit 10A. The crease-forming processing is an example of the processing action for processing the printing paper P1. The crease-forming processing is executed by the processing unit 10A, and thus a first portion Pc and a second portion Pd are formed on the printing paper P1.

The processing unit 10A has a cutter carriage 81, a blade 82, and an interposing member 83. The blade 82, which is an example of the processing member, is a round tooth. The blade 82 is provided on the cutter carriage 81. The blade 82 is formed so that the printing paper P1 is not cut even when the blade 82 contacts the printing paper P1. The interposing member 83 is formed with a recess 84. The recess 84 is arranged at a position opposed to the blade 82. The processing unit 10A presses the printing paper P1 against the recess 84 by means of the blade 82 by moving the cutter carriage 81 in the widthwise direction of the printing paper P1. Accordingly, the crease is formed along the processing position CL1 of the printing paper P1.

The present disclosure is not limited to the respective embodiments described above. It is possible to make various changes within a scope defined in claims. Any embodiment, which is obtained by appropriately combining the technical means disclosed in the different embodiments respectively, is also included in the technical scope of the present disclosure.

What is claimed is:

1. A printing apparatus comprising:
- a conveying unit configured to convey a printing medium in a conveying direction, the printing medium having an upstream end and a downstream end in the conveying direction;
- a printing unit configured to print an image on the printing medium conveyed by the conveying unit;
- a processing unit including a processing member and configured to execute a processing action for processing the printing medium, by moving the processing member while causing the processing member to contact the printing medium; and
- a controller configured to execute:
- a processing process for causing the processing unit to execute the processing action with respect to the printing medium by moving the processing unit from a first position to a second position along an intersecting direction intersecting with the conveying direction;
- a first conveying process for causing the conveying unit to convey the printing medium in the conveying direction until the upstream end of the printing medium moves to a position downstream in the conveying direction from the processing unit, after the processing process; and
- a first moving process for moving the processing unit from the second position to the first position after the first conveying process.

2. The printing apparatus according to claim 1, wherein:
- in a case that the processing process is executed for the printing medium on which an image of printing data of a final page included in a printing job is printed by the printing unit, the controller is configured to execute the first moving process after the first conveying process; and
- in a case that the processing process is executed for the printing medium on which an image of printing data of any page other than the final page included in the printing job is printed by the printing unit, the controller is configured to execute:
- a second moving process for moving the processing unit from the second position to the first position after the processing process; and
- a second conveying process for causing the conveying unit to convey the printing medium in the conveying direction until the upstream end of the printing medium moves to the position downstream in the conveying direction from the processing unit and causing the conveying unit to convey a next printing medium to be conveyed continuously to the printing medium, after the second moving process.

3. The printing apparatus according to claim 1, wherein:

in a case that a first predetermined condition is fulfilled, the controller is configured to execute the first moving process after the first conveying process; and in a case that a second predetermined condition different from the first predetermined condition is fulfilled, the controller is configured to execute:

a second moving process for moving the processing unit from the second position to the first position after the processing process; and a second conveying process for causing the conveying unit to convey the printing medium in the conveying direction until the upstream end of the printing medium moves to the position downstream in the conveying direction from the processing unit, after the second moving process.

4. The printing apparatus according to claim 3, wherein:

the first predetermined condition is a condition that a number of dots formed per unit area of a surface of the printing medium by the printing unit is not less than a predetermined number of dots; and the second predetermined condition is a condition that the number of dots formed per unit area of the surface is less than the predetermined number of dots.

5. The printing apparatus according to claim 3, wherein:

the first predetermined condition is a condition that an amount of ink ejected per unit area of a surface of the printing medium by the printing unit is not less than a predetermined amount of the ink; and the second predetermined condition is a condition that the amount of the ink ejected per unit area of the surface is less than the predetermined amount of the ink.

6. The printing apparatus according to claim 3, further comprising:

a receiving unit configured to receive an operation of a user for selecting one of a first mode for executing the first moving process after the first conveying process and a second mode for executing the second conveying process after the second moving process, wherein:

the first predetermined condition is a condition that the receiving unit receives an operation by the user for selecting the first mode; and the second predetermined condition is a condition that the receiving unit receives an operation by the user for selecting the second mode.

7. The printing apparatus according to claim 3, wherein the first predetermined condition and the second predetermined condition are conditions for limiting an environment around the printing apparatus.

8. The printing apparatus according to claim 3, wherein the first predetermined condition and the second predetermined condition are conditions for specifying a type of the printing medium.

9. The printing apparatus according to claim 1, wherein the controller is configured to execute the first moving process after executing the first conveying process and a third conveying process for causing the conveying unit to convey a next printing medium to be conveyed continuously to the printing medium such that a course, along which the processing unit moves, is positioned between the printing medium and the next printing medium.

10. The printing apparatus according to claim 9, wherein in a case that a resolution of the image printed on the printing medium by the printing unit is not less than a predetermined resolution, the controller is configured to execute the first moving process after executing the first conveying process and the third conveying process such that the course is positioned between the printing medium and the next printing medium.

11. The printing apparatus according to claim 9, wherein the controller is configured to execute the first conveying process and the third conveying process such that a first conveying speed of the printing medium is faster than a second conveying speed of the next printing medium.

* * * * *